United States Patent [19]

Degani et al.

[11] Patent Number: 5,150,832
[45] Date of Patent: Sep. 29, 1992

[54] SOLDER PASTE

[75] Inventors: Yinon Degani, Highland Park; John R. Morris, Jr., Cranbury, both of N.J.

[73] Assignee: AT&T Bell Laboratories, Murray Hill, N.J.

[21] Appl. No.: 724,561

[22] Filed: Jun. 28, 1991

[51] Int. Cl.⁵ .................... B23K 35/26; B23K 35/363
[52] U.S. Cl. ........................... 228/224; 228/248; 148/24; 148/25
[58] Field of Search ............ 228/207, 223, 224, 248; 148/24, 25

[56] References Cited

U.S. PATENT DOCUMENTS

| | | | |
|---|---|---|---|
| 4,487,638 | 12/1984 | Hoge | 228/224 |
| 4,759,490 | 7/1988 | Ochiai | 228/224 |
| 4,960,236 | 10/1990 | Hedges et al. | 228/224 |
| 5,064,482 | 11/1991 | Goobich et al. | 148/24 |

OTHER PUBLICATIONS

*Solder Paste in Electronic Packaging,* J. S. Hwang, Van-Nostrand, Reinhold, NY (1989), table of contents only.
*IPC Technical Paper,* TP-901, J. R. Morris et al, "Characterizing Solder Pastes for the 1990s", Institute for Interconnection and Packaging of Electronic Circuits, Lincolnwood, Ill., Sep. 1990.
*IPC-SP-819,* "General Requirements and Test Methods for Electronic Grade Solder Paste", Institute for Interconnection and Packaging of Electronic Circuits, Lincolnwood, Ill., Oct. 1988.

*Primary Examiner*—Samuel M. Heinrich
*Attorney, Agent, or Firm*—B. S. Schneider

[57] ABSTRACT

A solder flux that is useful in applications such as surface mounting of components on printed circuit boards has been found. After soldering, the residue from the flux is either removable by water cleaning or requires no cleaning at all. The achievement of these desirable properties is accomplished by employing a solder flux vehicle including a removing agent, a low vapor pressure component, a high temperature component, and a rheological properties promoter.

10 Claims, No Drawings

SOLDER PASTE

BACKGROUND OF THE INVENTION

1. Field of the Invention

This invention relates to soldering of electronic components and in particular to soldering involving solder fluxes and solder pastes.

2. Art Background

For many applications electronic components are surface mounted on a printed wiring board (PWB). This surface mounting is accomplished by positioning a component on a metallic contacting region of a PWB and introducing a solder paste between the leads and the corresponding contact pads. The assembly is then heated to a reflow temperature at which the soldering material flows and an electrically conductive joint between the lead and the solder contact pad is formed.

The solder paste in this soldering process contains solder balls of relatively small dimension, i.e., balls having a diameter in the range 5 $\mu$m to 100 $\mu$m, and a vehicle i.e., flux. The solder balls are used to insure the presence of sufficient electrical conductor to produce a low resistance joint between the component lead and the PWB contacting pad. The flux is employed to yield a variety of properties necessary for the soldering process. In particular, the flux is chosen so that it is possible to print the paste onto the contacting pads of the PWB through a stencil without depositing essentially any paste in other regions of the PWB. The paste is also chosen 1) to have good tackiness so that when the component lead is pressed onto the paste, it remains in position and 2) so that at the reflow temperature any solder in the paste that isn't precisely aligned with the contacting pads moves into the desired pad region through surface interactions. The flux also contains a dissolving agent that removes any oxide coating from the solder balls, the contacting pads and from the component lead. The flux additionally prevents reoxidation during reflow by in turn preventing oxygen from reaching the solder surface by diffusion through the flux.

In addition to all the other requirements placed on the solder flux, it is essential that after reflow any residue which remains is either non corrosive and cosmetically appealing or is removable by cleaning. Very few if any fluxes are available that leave no undesirable residue. Most fluxes leave residues which are cleaned with organic solvents. Environmental considerations presently have imposed strong impetus to formulate fluxes so that residue is removable with an aqueous medium. However, the fluxes presently suggested for aqueous cleaning are generally based on a vehicle containing inorganic halide (e.g., chlorides and bromides) as the oxide dissolving agent. These chlorides substantially increase the tendency for PWB components to corrode, provide mobile species which cause leakage current, and thus are not entirely desirable.

The formulation of a solder flux that satisfies all the required properties for the vehicle and that either produces no harmful/corroding residue or yields a residue that is soluble in an aqueous-based medium is extremely difficult to formulate. Additionally, such a formulation that doesn't substantially increase the tendency for components to corrode has been an elusive goal.

SUMMARY OF THE INVENTION

The desired properties of a flux vehicle together with the absence of a residue or the presence of a water soluble residue in a non-corroding medium is possible by a specific choice of components. In particular, the flux components should include an oxide removing agent such as an organic acid, a low vapor pressure component that evaporates before reflow but that solvates or dissolves in the other components, a high temperature component that evaporates slowly, and a rheological modifier that provides the viscosity required for suitable printing properties.

It is possible that one material functions as more than one component of the vehicle. For example, certain acids such as sebacic acid also function as the high temperature component. Exemplary fluxes include an acid such as malic acid, a low temperature vehicle such as glycerol, a high temperature vehicle such as sorbitol, and a rheological modifier such as hydroxy ethyl cellulose. Through this appropriate choice of materials either no residue or a water soluble residue is obtained in the soldering process.

DETAILED DESCRIPTION

As discussed, the inventive soldering fluxes are employed in a soldering process where a first conductor, e.g., an electronic component having electrically conductive leads, is soldered to a second conductive region such as runners in a PWB. Additionally, production of the reflow temperature which is typically in the range 130° C. to 340° C. is done by conventional techniques such as heat conduction, convection, radiation, or hot vapor condensation. The general procedure of soldering by subjecting components to be soldered and an intervening solder paste to heat sufficient to produce reflow is described in *Solder Paste in Electronic Packaging*, J. S. Hwang (1989), VanNostrand, Reinhold, N.Y., publishers.

The solder flux includes solder particles and a flux. The use of the term solder particles is generic and it is not employed to connote a specific shape. Typically, the volume of the particles (irrespective of shape) should be equivalent to the volume of a ball having a diameter in the range 5 to 100 $\mu$m. Generally, larger particles are not entirely desirable because of poor printing properties, while smaller particles have high surface area which promotes oxidation and tends to produce solder balling. The composition of the solder alloy is not critical and includes common solder alloys such as tin/lead (63/37; 5/95 wt. %) tin/silver (96.5/3.5 wt. %) tin/antimony (95/5 wt. %), and tin/bismuth (42/58 wt. %).

The flux should have sufficient material to satisfy four components characteristics. It is possible to use four discrete materials to yield these characteristics or a fewer number where individual materials satisfy more than one component characteristic. The four components include a removing agent such as an acid to dissolve, suspend or chemically reduce the metal oxides present such as lead oxide, a low temperature component that evaporates before or during reflow, a high temperature material that prevents oxygen from reoxidizing the metal portion of the paste, and a rheological modifier that yields the desired printability, tackiness and self-correction.

Various acids are suitable as oxide removing agents in the inventive solder fluxes. The acid chosen depends on whether the application requires a water cleanable residue or a flux that leaves a harmless residue in low yields. (Water soluble residue is one having a solubility at 50°

C. temperature of at least 1 gm per 50 gms of water.) Acids for water soluble residues should have a vapor pressure at 180° C. of less than 50 Torr and should have solubility in water of at least 1 gm per 600 gms of water at 25° C. degrees C. Typical acids for water soluble residues include malic acid, citric acid, tartaric acid, salicylic acid, adipic acid, and glutaric acid. Suitable acids where no residue is desired are 4-hydroxy benzoic acid and anizic acid, as well as oleic, stearic acid, linoleic acid and fatty acids of the formula

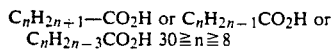
$C_nH_{2n+1}-CO_2H$ or $C_nH_{2n-1}CO_2H$ or $C_nH_{2n-3}CO_2H$ $30 \geq n \geq 8$ and dicarboxylic acids of the formula $HO_2C-(CH_2)_n-CO_2H$ $20 \geq n \geq 4$. Generally the acid should be about 1 to 15 wt. % of the vehicle composition.

The low temperature component of the vehicle should evaporate essentially completely during the increase of temperature to reflow, or during reflow, i.e., during the time when the solder is in a liquid state. However, this component should not substantially evaporate before application to the substrate. That is, in the ambient at room temperature (23° C.) on the printing applicator no more than 20 weight percent of the low temperature component should evaporate in two, preferably four, most preferably eight hours. The high temperature component should evaporate slowly at temperatures less than or equal to 180° C., i.e., should have a vapor pressure of less than 1 Torr for temperatures below 180° C., and should have a vapor pressure of less than 10 Torr at the reflow temperature. Additionally, this component should solvate or be soluble in the other components.

Typically, the high temperature component is present in an amount of at least 8 wt. %. Smaller amounts are not precluded but sufficient high temperature components should be present to prevent oxygen from reaching the solder. The high temperature component should not be present at more than 35 wt. % of the flux when no residue is required. When a material functions both as a high temperature component and as another component such as the acid, their combined presence should generally be 8 to 35. Typical materials that satisfy the properties of low temperature component include glycerine, polyethylene glycol with molecular weight less than 200, propylene glycol and polypropylene glycol for water cleanable paste and isopropyl myristate, poly butene mw$\leq$2,500 for low residue no clean paste. Exemplary materials for the high temperature component include, in the case of a water cleanable residue, sorbitol, manitol, $\alpha$-methyl glucoside, and polyethylene glycol 2,000$\geq$mw$\geq$400, while cholesterol, and most cooking oils such as corn or peanut oil are suitable for high temperature components where a low no clean residue is required.

The rheological properties promoter component is generally present in a weight percentage from 1 to 10%. Higher percentages produce undesired residue, while lower percentages produce insufficient viscosity. As discussed, the rheological properties promoter yields the desired tackiness, viscosity and printability needed for the solder flux. These properties are generally dependent on the viscosity of the material and on its ability to form intermolecular interactions. Typically, the rheological properties promoter is chosen to yield solder paste with a viscosity in the range 200,000 to 1,800,000 cps. Generally, a higher molecular weight polymers, i.e., polymers having a molecular weight greater than 100,000 are suitable for producing the desired viscosity and tackiness. For water cleaned residues, printing promoters such as polyvinyl pyrolidone, starch, hydroxy ethyl cellulose gums (e.g. arabic gum, tragacanth gum and xantan gum), polyacrylic acid, and polyacryl amide are suitable. Materials useful for a no residue flux include ethyl cellulose; poly (ethyleneacrylic acid) and poly butene.

A flux that yields a water cleanable residue that is particularly advantageous includes a vehicle of, 3-15 wt. % malic acid or citric acid, 1.5-7 wt. % hydroxy ethyl cellulose, 10-30 wt. % sorbitol, and the remainder glycerine.

The following examples are illustrative of the inventive flux composition and the inventive process for their use:

FLUX 1 EXAMPLE 1

Approximately 8 gr of malic acid; 2 gr of hydroxy ethyl cellulose and 20 gr of sorbitol were mixed with 70 gr glycerine in a glass beaker on a hot plate equipped with a magnetic stirrer. The temperature of the mixture was allowed to rise to 170° C. so that all ingredients were fully dissolved. The flux was then cooled to room temperature.

FLUX 2 EXAMPLE 2

A flux was prepared as in Example 1 using 8 gr of citric acid instead of the malic acid.

EXAMPLE 3

The following fluxes were prepared as in Example 1.
Flux #3 was prepared as flux #1 using 8 gr tartaric acid instead of malic acid;
Flux #4 was prepared as flux #1 using 5 gr 4-hydroxy benzoic acid instead of malic acid;
Flux #5 was prepared as flux #4 gr corn starch instead of hydroxy ethyl cellulose;
Flux #6 was prepared as flux #4 gr corn starch instead of hydroxy ethyl cellulose and 5 gr 4-hydroxy benzoic acid instead of malic acid;
Flux #7 was prepared as flux #1 using 1.0 gr Tragacanth Gum instead of hydroxy ethyl cellulose;
Flux #8 was prepared as flux #1 using 1.0 gr Tragacanth Gum instead of hydroxy ethyl and 5 gr 4 hydroxy benzoic acid instead of malic acid;
Flux #9 was prepared as flux #1 using 1.5 gr poly (vinyl pyrolidon)mw 300000 instead of hydroxy ethyl cellulose;
Flux #10 was prepared as flux #1 using 15 gr of dulcitol instead of sorbitol;
Flux #11 was prepared as flux #1 using 20 gr poly (ethylene glycol) mw 400 instead of sorbitol.

EXAMPLE 4

A paste (1) was prepared by mixing 5.5 gr of flux #1 with 44.5 gr of Sn/Pb (63/37) powder $-325+500$ mesh. The stearing continued until an essentially homogeneous paste was formed. Paste #2 was made by mixing 5 gr of flux #1 with 44 gr of Sn/Ag (96.5/3.5) powder ($-325+500$ mesh)

The following pastes were also made:
paste #3 was made as paste #1 using flux #2;
paste #4 was made as paste #1 using flux #3;
paste #5 made as paste #1 using flux #4;
paste #6 made as paste #1 using flux #5;
paste #7 made as paste #1 using flux #6;

paste #8 made as paste #1 using flux #7;
paste #9 made as paste #1 using flux #8;
paste #10 made as paste #1 using flux #9;
paste #11 made as paste #1 using flux #10;
paste #12 made as paste #1 using flux #11;

Pastes 1-12 were evaluated for reliability and process compatibility using the tests described in Morris, J. R. et al., "Characterizing Solder Pastes for the 1990s", *IPC Technical Paper*, TP-901", Institute for Interconnection and Packaging of Electronic Circuits, Lincolnwood, Ill., September, 1990. As indicated by Bellcore in *Bellcore TR-TSY*-000078, Issue 2, "General Physical Design Requirements for Telecommunications Products and Equipment", Bellcore, Red Bank, N.J., a water cleanable soldering material for use on telecommunications equipment should have an after cleaning surface insulation resistance (SIR) value of greater than $3 \times 10^9$ ohms on solder mask striped coupons. Over 30 compositions containing various combinations of the ingredients listed in Examples 1, 2, and 3 were evaluated. The SIR along with other properties of the paste are affected by compositional changes, and that while not all compositions tested met the stringent reliability requirements of telecommunications products, all compositions had sufficiently high SIR to be considered for other applications. Paste 7 and Paste 10 exhibited the high surface insulation resistance needed for telecommunications products.

Corrosion to copper was evaluated using copper mirror tests as discussed in *IPC-SP*-819, "General Requirements for Electronic Grade Solder Paste", Institute for Interconnection and Packaging of Electronic Circuits, Lincolnwood, Ill., 1988. Paste 5 and Paste 9 passed even in the raw (unheated) state.

Cleanability was evaluated visually after rinsing under warm running water and after cleaning in a commercial in-line cleaner. All residues were easily removed leaving no residues visible to the naked eye. Closer observation with a microscope showed very small amounts of a whitish material around the fillets for some compositions. Mechanical removal of discrete components showed no residue under the components after cleaning. The highly water soluble nature of the flux constituents make these materials significantly more cleanable than current commercial water soluble solder pastes.

As an additional test for cleanability, some circuit boards were tested for ionic cleanliness. Paste 7 was printed on the boards, components were machine placed, the board were passed through a reflow oven, and the boards were cleaned in a commercial aqueous cleaner. No detergent or saponifier was used. Visual inspection showed no visible residue after cleaning, and water extract conductivity measurements (Omegameter 600 SMD 75/25 IPA/H$_2$O) showed an average ionic contamination of 0.2 to 0.8 micrograms/in$^2$ NaCl equivalent.

Pastes 1-12 were all adequately printable for 50-mil pitch applications and pastes 1, 2, 3, 4, 5, 11, 12 were acceptable for finer (25-mil pitch) use. All compositions had minimal thermal slump, acceptable for 25 mil-pitch applications. The pastes had adequate tackiness (approximately 1.0 g/mm$^2$ as per IPC-SP-819, supra), and excellent tack life, on the order of 24 hours or more. This tack life was significantly greater than that of current commercial materials which have tack lives of a few hours. In addition the shelf life of these materials was significantly greater than the 1 month typical of commercial materials.

We claim:

1. A process for soldering comprising the steps of printing a solder paste on at least one of a first and second body bringing into close proximity said first and said second body in an oxygen containing ambient, and heating said paste at a reflow temperature characterized in that said paste comprises:
   a) a solder;
   b) a removing agent for metal oxides;
   c) a low temperature component that substantially evaporates below or at said reflow temperature but does not substantially evaporate at room temperature;
   d) a high temperature component that prevents reoxidation of said solder and that has a vapor pressure of less than 1 Torr at 180° C.; and
   e) a rheological modifier that allows said printing whereby residue remaining after said reflow is substantially avoided or is substantially soluble in an aqueous based medium.

2. The process of claim 1 wherein said removing agent comprises an organic acid.

3. The process of claim 2 wherein said low temperature component comprises a material chosen from the group consisting of glycerine, polyethylene glycol with molecular weight less that 200, propylene glycol, polypropylene glycol, poly butene with molecular weight lower than 1,000 and isopropyl myristate.

4. The process of claim 3 wherein said high temperature component comprises a material chosen from the group consisting of sorbitol, manitol, α-methyl glucoside, polyethylene glycol with molecular weight between about 400 and 2,000, cholesterol, corn oil, peanut oil and poly butene of molecular weight larger than 1,000 and lower than 2,500.

5. The process of claim 1 wherein said low temperature component comprises a material chosen from the group consisting of glycerine, polyethylene glycol with molecular weight less that 200, porpylene glycol polypropylene glycol, poly butene with molecular weight lower than 1,000 and isopropyl myristate.

6. The process of claim 1 wherein said high temperature component comprises a material chosen from the group consisting of sorbitol, manitol, α-methyl glucoside, polyethylene glycol with molecular weight between about 400 and 2,000, cholesterol, corn oil, peanut oil and poly butene of molecular weight larger than 1,000 and lower than 2,500.

7. The process of claim 1 where said solder comprises a lead/tin alloy.

8. The process of claim 1 where said solder comprises a tin/silver alloy.

9. The process of claim 1 where said solder comprises a tin/antimony alloy.

10. The process of claim 1 wherein said reflow temperature is in the range 130 to 340 degrees C.

* * * * *